(12) United States Patent
Wessner

(10) Patent No.: US 7,321,104 B2
(45) Date of Patent: Jan. 22, 2008

(54) COOLING DUCT OF A LASER PROCESSING MACHINE

(75) Inventor: Michael Wessner, Gerlingen (DE)

(73) Assignee: TRUMPF Werkzeugmaschinen GmbH & Co. KG, Ditzingen (DE)

( * ) Notice: Subject to any disclaimer, the term of this patent is extended or adjusted under 35 U.S.C. 154(b) by 0 days.

(21) Appl. No.: 10/792,903

(22) Filed: Mar. 5, 2004

(65) Prior Publication Data

US 2004/0232120 A1   Nov. 25, 2004

(30) Foreign Application Priority Data

Mar. 5, 2003   (EP) .................................. 03004784

(51) Int. Cl.
*B23K 26/14* (2006.01)
*B23K 26/16* (2006.01)

(52) U.S. Cl. ............................ 219/121.67; 219/121.86; 219/121.84

(58) Field of Classification Search ............ 219/121.67, 219/121.86, 121.84, 121.69, 121.68, 121.85
See application file for complete search history.

(56) References Cited

U.S. PATENT DOCUMENTS

| | | | | |
|---|---|---|---|---|
| 5,073,694 A | * | 12/1991 | Tessier et al. ............ | 219/121.7 |
| 5,345,057 A | * | 9/1994 | Muller .................... | 219/121.71 |
| 5,424,508 A | * | 6/1995 | Swain et al. ............ | 219/121.84 |

FOREIGN PATENT DOCUMENTS

| | | |
|---|---|---|
| DE | 202 16 214 | 1/2003 |
| EP | 1 175 953 | 1/2002 |
| EP | 1175953 A2 * | 1/2002 |
| JP | 61-20680 | 1/1986 |
| JP | 4-262889 | 9/1992 |
| JP | 4262889 * | 9/1992 |
| JP | 11-090661 | 4/1999 |
| WO | WO 00/69594 | 11/2000 |

* cited by examiner

*Primary Examiner*—M. Alexandra Elve
(74) *Attorney, Agent, or Firm*—Fish & Richardson P.C.

(57) ABSTRACT

An apparatus for the removal of waste heat and material during laser cutting of a hollow workpiece by a laser beam includes a duct with external dimensions that permit insertion of at least a portion of the duct within the hollow workpiece, a chamber within the duct for receiving the laser beam, and an opening in an outer surface of the duct for admitting the laser beam into the chamber. The apparatus further includes a first inlet in the duct for supplying a liquid to the chamber, a second inlet in the duct for supplying a gas to the chamber, and a nozzle adapted for supplying a mixture of the liquid and the gas to the chamber.

24 Claims, 2 Drawing Sheets ized liquid.
COOLING DUCT OF A LASER PROCESSING MACHINE

CLAIM OF PRIORITY

This application claims priority under 35 USC § 120 to European Patent Application Serial No. 03004784, filed on Mar. 5, 2003, the entire contents of which are hereby incorporated by reference.

TECHNICAL FIELD

This disclosure concerns the removal of particles, vapors, and/or gases from a workpiece during laser processing of the workpiece, for example, during the laser cutting of a pipe.

BACKGROUND

During laser cutting of a pipe, or other enclosed workpieces, the melt waste is deposited in the form of splashes inside the pipe, which often necessitates an additional processing step to clean the pipes. The power of the laser beam that is not absorbed by the kerf hits the opposite lower side of the pipe where it produces overheating and forms a ridge or melts this pipe region.

The technical teaching of Germany Patent DE 202 16 214 U1 discloses a hollow duct that is connected to a suction blower. During laser cutting, the hollow duct is located below the workpiece to be processed (e.g., in the pipe to be processed). The hollow duct suctions off particles, vapors and gases that are produced during cutting.

For the processing of pipes, a small pipe diameter requires an even smaller duct diameter to be able to introduce the duct into the inside of the pipe. Small duct diameters, however, impair the flow conditions and the suction effect. Moreover, suctioning with very small pipe diameters is not possible with conventional means.

SUMMARY

Laser cutting waste materials can be removed from the laser cutting site by flowing a fluid through a duct that is located adjacent to the laser cutting site.

In a first general aspect, an apparatus for the removal of waste heat and material during laser cutting of a hollow workpiece by a laser beam includes a duct with external dimensions that permit insertion of at least a portion of the duct within the hollow workpiece, a chamber within the duct for receiving the laser beam, and an opening in an outer surface of the duct for admitting the laser beam into the chamber. The apparatus further includes a first inlet in the duct for supplying a liquid to the chamber, a second inlet in the duct for supplying a gas to the chamber, and a nozzle adapted for supplying a mixture of the liquid and the gas to the chamber.

In another general aspect, a laser cutting apparatus includes a laser for cutting a hollow workpiece and the apparatus for the removal of waste heat and material during laser cutting of the hollow workpiece.

One or more of the following features may be included. For example, the apparatus may further include a channel adapted to conduct liquid from the first inlet to the chamber and to conduct gas from the second inlet to the chamber. The duct may include an inner pipe and an outer pipe and the channel may be formed between the two pipes. The apparatus may further include an outlet coupled to the chamber, where the outlet is adapted for coupling to a pump, such that fluid can be suctioned from the chamber by the pump. The liquid supplied to the chamber can be water or oil, and the gas supplied to the chamber can be compressed air. the liquid is oil and the gas is compressed air. The nozzle can be adapted for supplying the mixture of the liquid and the gas as a mist of atomized liquid.

In a further general method, a method of removing waste from within a hollow workpiece during laser cutting of the hollow workpiece includes positioning at least a portion of a hollow duct within the workpiece, laser cutting a portion of the workpiece, and delivering a fluid to a chamber within the duct while the workpiece is being cut, wherein the chamber is located in a path of the laser.

One or more of the following features may be included. For example, the fluid may be a gas-liquid mixture, a liquid, or a gas. The method may further include delivering a gas flow to the chamber and delivering a liquid flow to the chamber. The method may further include mixing the gas flow and the fluid flow in a nozzle to create the gas-liquid mixture. The method may further include applying a suction to the chamber to remove the fluid from the chamber.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
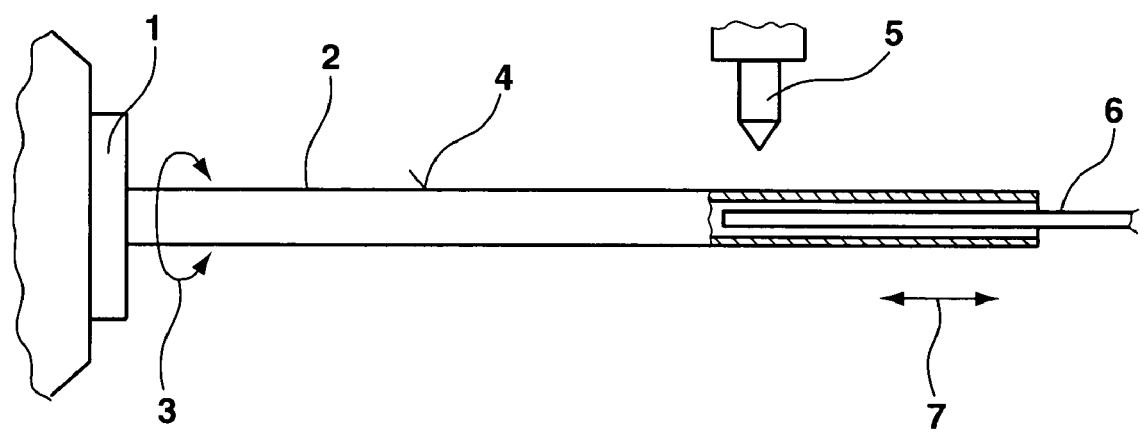
FIG. 1 is a side view of parts of a laser cutting system.

FIG. 1 shows a laser cutting system that includes a chuck 1 for holding a workpiece (e.g., a pipe) 2 to be processed. The pipe 2 is rotatably disposed (see direction of rotation 3) to permit processing of the outer peripheral surface 4 of the pipe by a laser beam that is emitted from a processing head 5 of the laser cutting system and that is focused onto the outer peripheral surface 4 of the pipe. The processing head 5 can be positioned in the x-, y- and z-directions above the outer peripheral surface 4 of the pipe. The laser cutting system permits cutting holes, recesses, grooves, separating cuts, etc. into the pipe 2.

A pipe-shaped cooling and/or rinsing duct 6 arranged concentrically to the pipe 2 is disposed in the pipe 2 such that it can be pushed in and out of the pipe 2 (see double arrow 7). The duct 6 is used to prevent melt waste in the form of splashes and deposits from accumulating in the inside of the pipe during laser cutting of the pipe 2.

Figure 2:
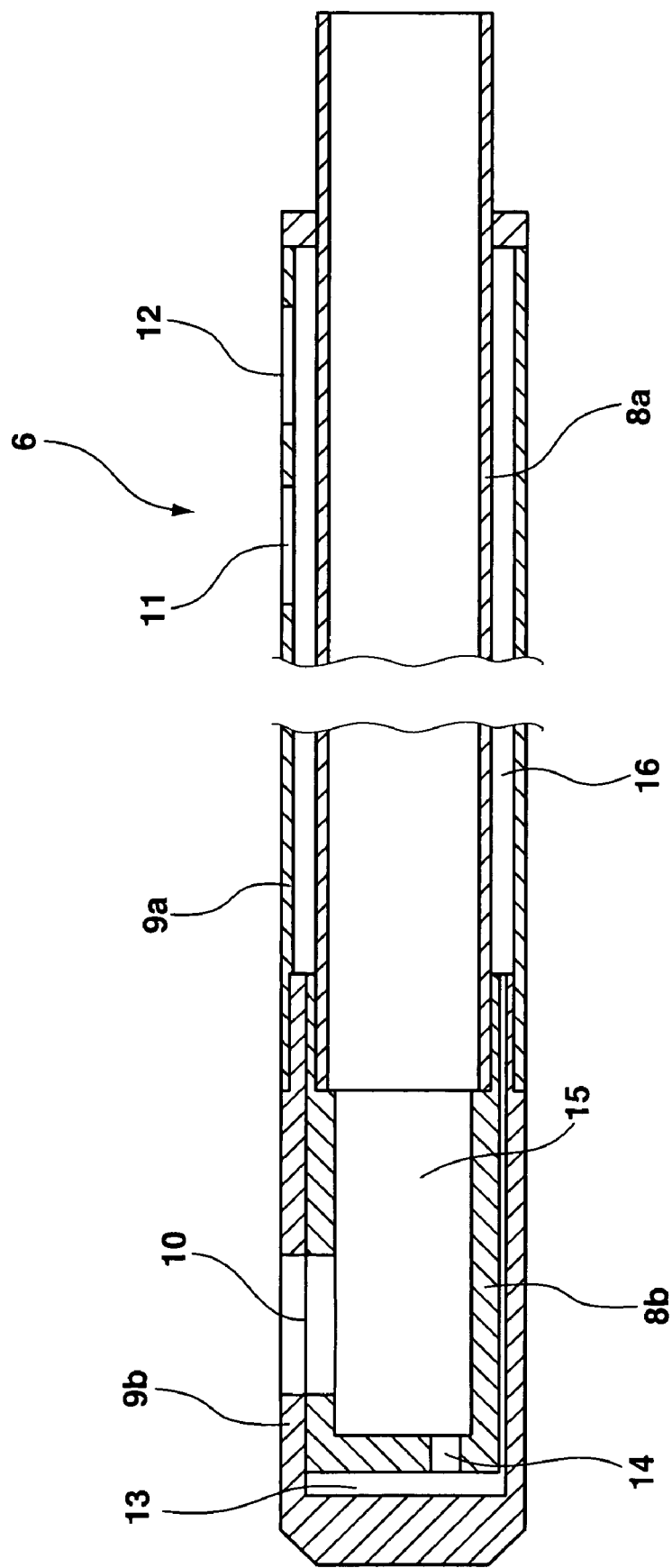
FIG. 2 is a longitudinal section through an enlarged illustration of a cooling and/or rinsing duct of the laser cutting system.

FIG. 2 shows the structure and function of the duct 6 when used during laser processing of a workpiece. To facilitate construction of the duct 6, the duct can be formed of nested pipe-shaped duct parts. For example, the duct 6 can be formed of an inner, two-part duct pipe and an outer two-part duct pipe, wherein the inner duct parts (8a, 8b) and outer (9a, 9b) duct parts are each joined to each other in a positive and material-bonding fashion (e.g., screwed or welded) and the inner parts (8a, 8b) are inserted into the outer parts (9a, 9b). Two one-part or integral duct pipes are also feasible. One end of the duct 6 associated with the laser beam is closed except for an inlet opening 10 for the laser beam, while the other end is open and can be connected to a pump to provide suction to the interior of the duct. The inlet opening 10 for the laser beam, a supply opening 11 for introducing a liquid medium (e.g., oil or cooling water), a supply opening 12 for injecting a gaseous medium such as compressed air, a chamber 13, and a nozzle 14 are formed within the duct 6.

Thus, the duct interior 15 can be rinsed with a gas, a liquid, or a gas-liquid mixture. Fog or oil mist can be generated by mixing the liquid medium introduced through opening 11 with the gaseous medium introduced through opening 12. The duct is positioned within the pipe 2 with respect to the laser processing head 5, such that the pipe 2 is processed directly above the inlet opening 10 of the duct 6. The laser beam and the melt waste reach the interior 15 of the duct 6 by way of the inlet opening 10. The two-phase flow (gas-liquid mixture) in the duct interior of the duct 6 assists in extracting slag and vapor that are produced during laser cutting out of the duct interior 15. The duct 6 therefore provides a splash-free and clean inside of the pipe 2 while the pipe is being processed as well as good heat dissipation in the region of the laser processing. Furthermore heating of parts of the workpiece that are not intended to be heated is prevented.

When the laser beam has cut a hole into the pipe 2 and shines into the inlet opening 10, the laser beam, as well as melt waste, cutting splashes, and/or vapors can enter the duct interior 15 of the duct 6 that is disposed below the workpiece to be processed or within the pipe 2. Duct 6 includes an annular channel 16 that is connected to a chamber 13. When cooling water is supplied through the inlet opening 11 into the annular channel 16, and compressed air is supplied through the supply opening 12 also into the common annular channel 16, a type of fog with finely distributed accelerated water droplets is discharged through a nozzle 14 out of the chamber 13 into the duct interior 15. This fog or mist absorbs sufficient laser power during laser cutting and discharges the cutting splashes and vapors through its suction effect. The interior of the pipe is largely kept free by discharging the cutting splashes and vapor through the duct interior 15.

The liquid supplied through opening 11 is transformed into the dispersive state by way of the nozzle 14 that atomizes the liquid. Gas in the liquid is dispersed inside the nozzle 14 and thereby produces a kind of spray with small droplets. A two-phase mixture of gas and liquid exits the nozzle outlet cross-section of the nozzle 14.

The cooling and cleaning effect of the duct 6 can be further improved in that the gas-liquid mixture continuously flows through the duct 6 when the duct 6 is connected to a pump for suctioning the gas-liquid mixture from the interior of the duct.

Water and compressed air are the preferred media for the cooling and/or rinsing process. Other suitable media also may be used.

OTHER EMBODIMENTS

A number of embodiments of the invention have been described. Nevertheless, it will be understood that various modifications may be made. Accordingly, other embodiments are within the scope of the following claims.

What is claimed is:

1. An apparatus for the removal of waste heat and material during laser cutting of a hollow workpiece by a laser beam, the apparatus comprising:

a duct with external dimensions that permit insertion of at least a portion of the duct within the hollow workpiece;
    a chamber within the duct for receiving the laser beam;
    an opening in an outer surface of the duct for admitting the laser beam into the chamber;
    a liquid inlet in the duct for supplying a liquid to the chamber;
    a gas inlet in the duct for supplying a gas to the chamber; whereby the opening for the laser, the liquid inlet and the gas inlet are separate and distinct from each other; and
    a nozzle that is fluidly coupled to the liquid inlet, to the gas inlet, and to the chamber for supplying a mixture of the liquid and the gas to the chamber.

2. The apparatus of claim 1, further comprising a channel to conduct liquid from the liquid inlet to the chamber and to conduct gas from the gas inlet to the chamber.

3. The apparatus of claim 2, wherein the duct includes an inner pipe and an outer pipe and the channel is formed between the two pipes.

4. The apparatus of claim 1, further comprising an outlet coupled to the chamber, wherein the outlet can be coupled to a pump, such that fluid can be suctioned from the chamber by the pump.

5. The apparatus of claim 1, wherein the liquid is water and wherein the gas is compressed air.

6. The apparatus of claim 1, wherein the liquid is oil and the gas is compressed air.

7. The apparatus of claim 1, wherein the nozzle supplies the mixture of the liquid and the gas as a mist of atomized liquid.

8. A laser cutting apparatus comprising:

a laser for cutting a hollow workpiece; and
    an apparatus for the removal of waste heat and material during laser cutting of the hollow workpiece, the apparatus comprising:
    a duct with external dimensions that permit insertion of the duct within the hollow workpiece;
    a chamber within the duct for receiving the laser beam;
    an opening in an outer surface of the duct for admitting the laser beam into the chamber;
    a liquid inlet in the duct for supplying a liquid to the chamber;
    a gas inlet in the duct for supplying a gas to the chamber; whereby the opening for the laser, the liquid inlet and the gas inlet are separate and distinct from each other; and
    a nozzle that is fluidly coupled to the liquid inlet, to the gas inlet, and to the chamber for supplying a mixture of the liquid and the gas to the chamber; and
    a pump operably connected to the chamber for evacuating the chamber.

9. The laser cutting apparatus of claim 8, wherein the duct further comprises a channel to conduct liquid from the liquid inlet to the chamber and to conduct gas from the gas inlet to the chamber.

10. The laser cutting apparatus of claim 9, wherein the duct includes an inner pipe and an outer pipe and the channel is formed between the two pipes.

11. The laser cutting apparatus of claim 8, wherein the duct further comprises an outlet coupled to the chamber, and wherein the outlet can be coupled to a pump, such that fluid can be suctioned from the chamber by the pump.

12. The apparatus of claim 8, wherein the liquid is water and wherein the gas is compressed air.

13. The apparatus of claim 8, wherein the liquid is oil and the gas is compressed air.

14. The apparatus of claim 8, wherein the nozzle supplies the mixture of the liquid and the gas as a mist of atomized liquid.

15. A method of removing waste from within a hollow workpiece during laser cutting of the hollow workpiece, the method comprising:
positioning at least a portion of a hollow duct within the workpiece;
laser cutting a portion of the workpiece; and
delivering a gas-liquid mixture through a nozzle to a chamber within the duct while the workpiece is being cut, wherein the chamber is located in a path of the laser, and wherein the hollow duct comprises an opening in an outer surface of the duct for admitting the laser beam into the chamber; a liquid inlet in the duct for supplying a liquid to the chamber; a gas inlet in the duct for supplying a gas to the chamber; whereby the opening for the laser, the liquid inlet and the gas inlet are separate and distinct from each other; and a nozzle fluidly coupled to the liquid inlet, to the gas inlet, and to the chamber for supplying the mixture of the gas and the liquid to the chamber.

16. The method of claim 15, wherein delivering the gas-liquid mixture includes delivering a mist of atomized liquid.

17. The method of claim 16, wherein delivering the gas-liquid mixture comprises:
delivering a gas flow to the chamber; and
delivering a liquid flow to the chamber.

18. The method of claim 17, wherein delivering the liquid flow to the chamber includes delivering the liquid flow to an annular channel defined within the duct and the chamber.

19. The method of claim 17, wherein delivering the gas flow to the chamber includes delivering the gas flow to an annular channel defined within the duct and the chamber.

20. The method of claim 17, wherein delivering the gas-liquid mixture comprises mixing the gas flow and the liquid flow in a nozzle to create the gas-liquid mixture.

21. The method of claim 15, further comprising applying a suction to the chamber to remove the fluid from the chamber.

22. The method of claim 15, wherein delivering the gas-liquid mixture includes delivering a mixture of water and compressed air.

23. The method of claim 15, wherein delivering the gas-liquid mixture includes delivering a mixture of oil and compressed air.

24. The apparatus of claim 2, wherein the channel is in fluid communication with the liquid inlet, the gas inlet, and the chamber.

* * * * *